United States Patent
Sawada

(10) Patent No.: US 10,314,060 B2
(45) Date of Patent: Jun. 4, 2019

(54) COMMUNICATION APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Tetsuya Sawada, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 71 days.

(21) Appl. No.: 15/409,945

(22) Filed: Jan. 19, 2017

(65) Prior Publication Data
US 2017/0208608 A1 Jul. 20, 2017

(30) Foreign Application Priority Data
Jan. 19, 2016 (JP) .................. 2016-008292

(51) Int. Cl.
*H04W 72/12* (2009.01)
*H04W 8/00* (2009.01)

(52) U.S. Cl.
CPC ......... *H04W 72/121* (2013.01); *H04W 8/005* (2013.01)

(58) Field of Classification Search
CPC .................. H04W 72/121; H04W 8/005
See application file for complete search history.

(56) References Cited

U.S. PATENT DOCUMENTS

| | | | |
|---|---|---|---|
| 2014/0302787 A1 | 10/2014 | Rantala et al. | |
| 2014/0321317 A1 | 10/2014 | Kasslin et al. | |
| 2015/0036540 A1* | 2/2015 | Kasslin | H04W 48/18 370/254 |
| 2016/0286476 A1* | 9/2016 | Patil | H04W 40/32 |
| 2016/0286574 A1* | 9/2016 | Abraham | H04L 63/065 |
| 2016/0309493 A1* | 10/2016 | Shmukler | H04W 76/23 |
| 2017/0086157 A1* | 3/2017 | Abraham | H04W 56/004 |
| 2017/0150296 A1* | 5/2017 | Jung | H04L 12/1886 |

OTHER PUBLICATIONS

U.S. Appl. No. 62/221,597, filed 2015.*
U.S. Appl. No. 62/138,938, filed 2015.*
U.S. Appl. No. 62/150,210, filed 2015.*
U.S. Appl. No. 62/261,266, filed 2015.*

* cited by examiner

*Primary Examiner* — Brandon M Renner
*Assistant Examiner* — Jay L Vogel
(74) *Attorney, Agent, or Firm* — Carter, DeLuca & Farrell LLP

(57) ABSTRACT

A communication apparatus belonging to a cluster based on Neighbor Awareness Networking (NAN), controls to establish a data link for performing data communication in the cluster, determines whether there is another cluster which can be integrated with the cluster, and decides, based on the determination result, a period during which the data link is established.

7 Claims, 12 Drawing Sheets

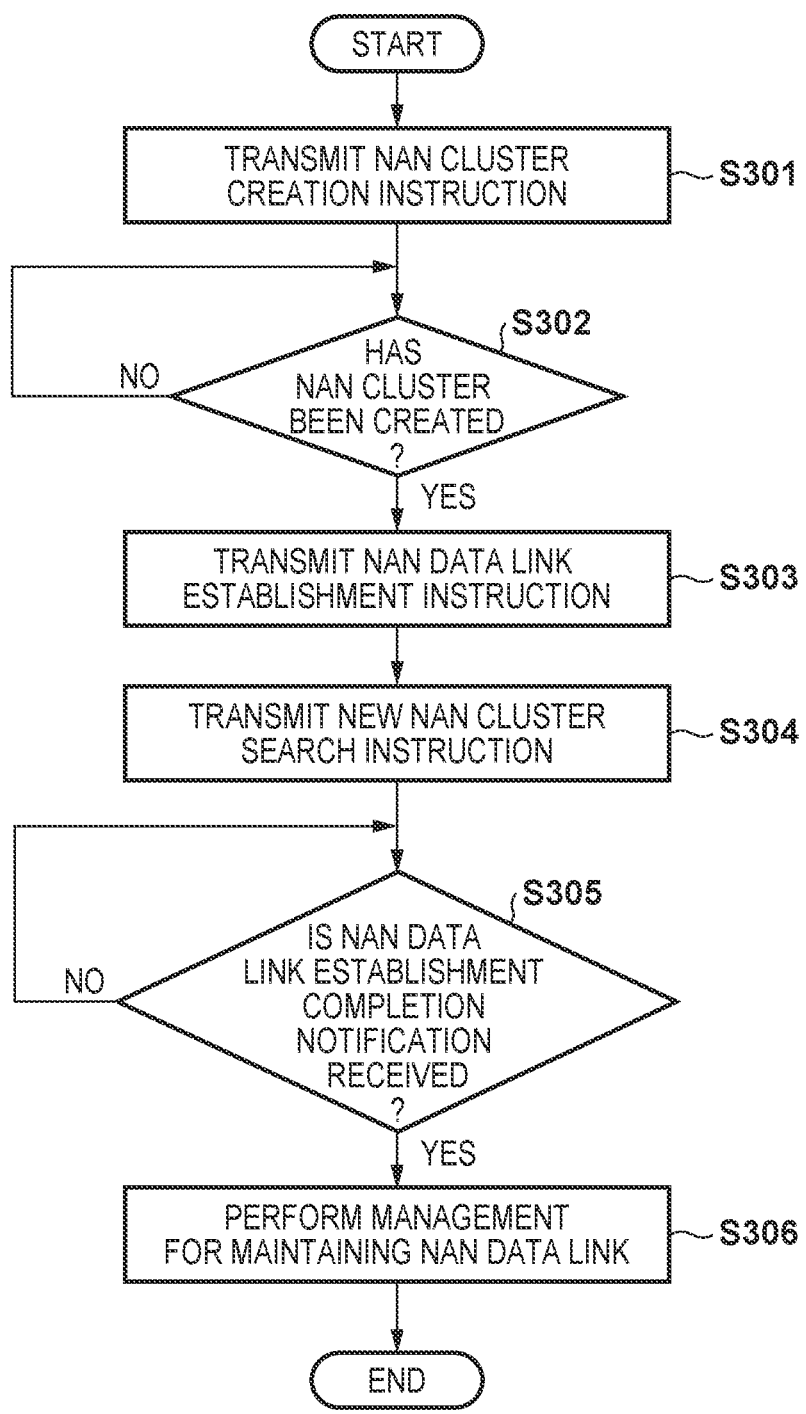

COMMUNICATION APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to a communication apparatus, a control method therefor, and a non-transitory computer-readable storage medium.

Description of the Related Art

In recent years, in a wireless local area network (LAN), there has been proposed a technique of recognizing a nearby wireless LAN device or a technique (Neighbor Awareness Networking (NAN)) of recognizing a network formed by a nearby wireless LAN device or a service provided in the network. Such network and wireless LAN device are respectively called a neighbor awareness network (NAN) and a NAN device.

For example, U.S. Patent Application Publication Nos. 2014/0302787, 2014/0321317, and 2015/0036540 propose techniques in which LAN devices transmit beacons to be synchronized with each other, and set a cyclic search period called a discovery window (to be referred to as a DW hereinafter), thereby recognizing each other during the period. In Neighbor Awareness Networking (NAN), there is also proposed a technique of establishing a data link, as needed, during an additional period other than the DW based on recognition during the DW, and performing data communication, which is called a NAN data link. In these techniques, a plurality of NAN devices form NAN called a "cluster" in which DW synchronization is established, and recognize each other on a cluster basis to perform data communication. If many clusters are formed, DWs are provided for each cluster, and the efficiency may deteriorate in terms of power consumption, the processing load of a search, effective use of a band, and the like. In consideration of this case, there is also proposed a technique of integrating (merging) clusters.

In the above conventional techniques, a data link (NAN data link) is established for each cluster, and a case in which the clusters are merged is not sufficiently considered. If cluster A is merged into cluster B, it may not be possible for a data link established in cluster A to be established in cluster B, or this may be inefficient. For example, if the period of the data link established in cluster A overlaps the DW of cluster B, and cluster A is merged into cluster B, data communication in cluster A cannot be continued in cluster B or influences the DW of cluster B.

SUMMARY OF THE INVENTION

According to one aspect of the present invention, there is provided a communication apparatus belonging to a cluster based on Neighbor Awareness Networking (NAN), which comprises: a data link control unit configured to control to establish a data link for performing data communication in the cluster; a determination unit configured to determine whether there is another cluster which can be integrated with the cluster; and a decision unit configured to decide, based on a result of determination by the determination unit, a period during which the data link is established.

Further features of the present invention will become apparent from the following description of exemplary embodiments (with reference to the attached drawings).

BRIEF DESCRIPTION OF THE DRAWINGS

FIG. 3 is a flowchart illustrating the processing of a NAN device control unit 203 according to the first embodiment;

DESCRIPTION OF THE EMBODIMENTS

First Embodiment

Figure 1:
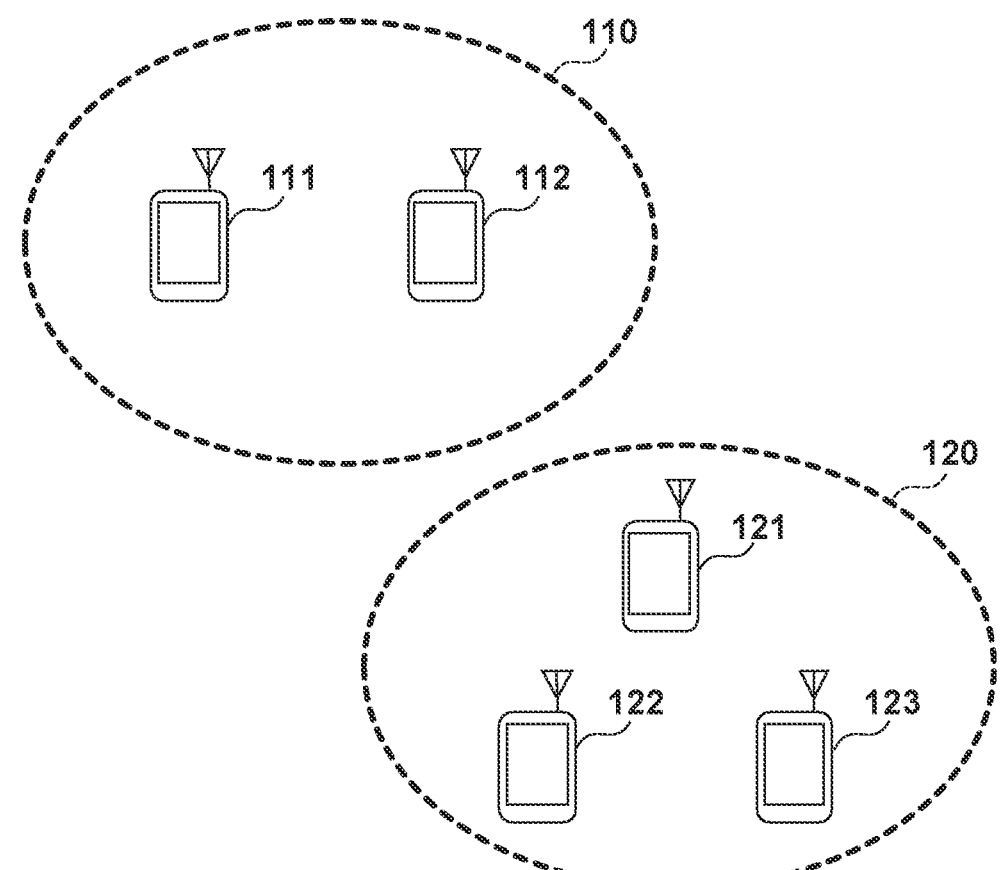
FIG. 1 is a view showing an example of the configuration of a wireless LAN system.

The first embodiment will be described below with reference to FIGS. 1 to 9. FIG. 1 shows an example of the configuration of a wireless LAN system according to the first embodiment. An example in which a wireless LAN system complying with Neighbor Awareness Networking (NAN) is used will be explained below. Each of NAN clusters 110 and 120 is formed from some NAN devices. NAN devices 111 and 112 join (i.e., belong to) the NAN cluster 110, and can recognize each other to perform data communication. Similarly, NAN devices 121, 122, and 123 join (i.e., belong to) the NAN cluster 120, and can recognize each other to perform data communication.

Figure 2A:
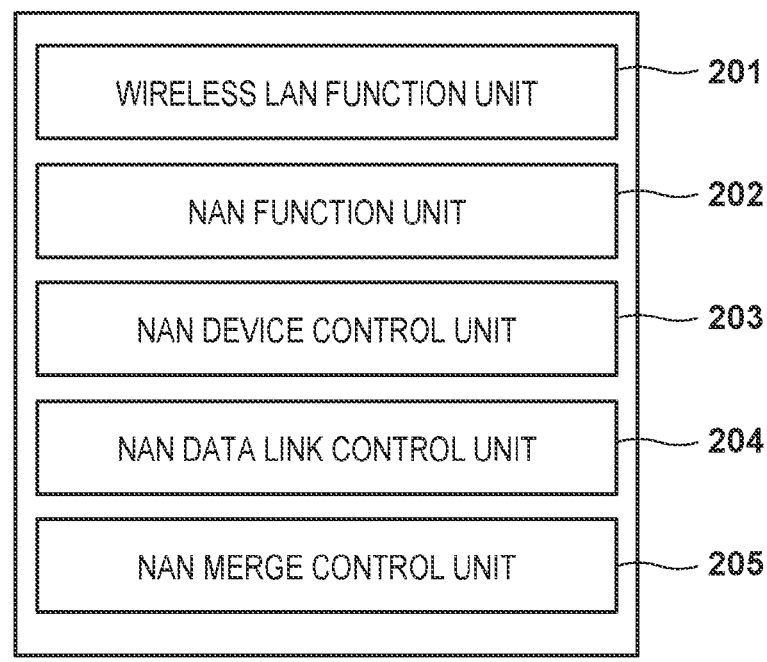
FIGS. 2A and 2B are block diagrams each showing the arrangement of a NAN device 111 according to the first embodiment.
Figure 2B:
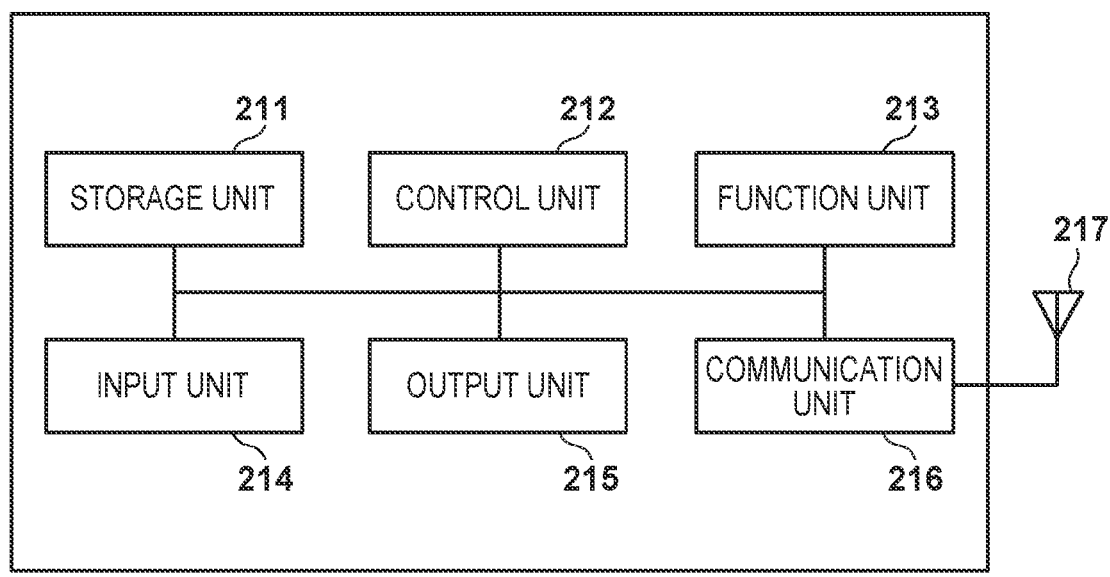

FIGS. 2A and 2B each show the arrangement of the NAN device 111 according to this embodiment. FIG. 2A shows the functional arrangement of the NAN device 111, and FIG. 2B shows the hardware arrangement of the NAN device 111.

The functional arrangement of the NAN device 111 will be described with reference to FIG. 2A. A wireless LAN function unit 201 implements a known wireless LAN function necessary to operate as a NAN device. The wireless LAN function unit 201 implements a function of wireless communication complying with the IEEE802.11 standard or Internet Protocol (IP) communication. A NAN function unit 202 implements a known NAN function necessary to operate as a NAN device. The NAN function unit 202 implements a function for joining a NAN cluster complying with the NAN standard, recognizing another NAN device, and performing data communication with the other NAN device. A NAN device control unit 203 controls the overall NAN device 111. A NAN data link control unit 204 controls establishment of a NAN data link for performing data communication in the NAN cluster which the NAN device 111 joins. A NAN merge control unit 205 controls the NAN device 111 to search for a nearby NAN cluster and acquire information, and controls to integrate (merge) the cluster into the nearby NAN cluster as a new NAN cluster and join the merged cluster.

The hardware arrangement of the NAN device 111 will be described next with reference to FIG. 2B. A storage unit 211 is formed by one or both of a ROM (Read Only Memory) and a RAM (Random Access Memory), and stores programs for executing various operations (to be described later) and various kinds of information such as communication parameters for wireless communication. Note that instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 211.

A control unit 212 is formed by a CPU (Central Processing Unit) or MPU (Micro Processing Unit), and controls the overall NAN device 111 by executing the programs stored in the storage unit 211. Note that the control unit 212 may control the overall NAN device 111 in cooperation with an OS (Operating System) and the programs stored in the storage unit 211. The control unit 212 controls a function unit 213 to execute predetermined processing such as image capturing, printing, and projection.

The function unit 213 is hardware used by the NAN device 111 to execute predetermined processing. If, for example, the NAN device 111 is a camera, the function unit 213 serves as an image capturing unit, and performs image capturing processing. If, for example, the NAN device 111 is a printer, the function unit 213 serves as a printing unit, and performs print processing. If, for example, the NAN device 111 is a projector, the function unit 213 serves as a projection unit, and performs projection processing. Data processed by the function unit 213 may be data stored in the storage unit 211 or data communicated with another NAN device via a communication unit 216 (to be described later).

An input unit 214 accepts various operations from the user. An output unit 215 performs various kinds of output operations to the user. The output from the output unit 215 includes at least one of display on a screen, a voice output from a loudspeaker, a vibration output, and the like. Note that both of the input unit 214 and the output unit 215 may be implemented by one module like a touch panel.

The communication unit 216 controls wireless communication complying with the IEEE802.11 standard series, and controls IP (Internet Protocol) communication. The communication unit 216 controls an antenna 217 to transmit/receive a wireless signal for wireless communication. The NAN device 111 communicates a content such as image data, document data, or video data with another NAN device via the communication unit 216.

FIG. 3 is a flowchart illustrating the processing of the NAN device control unit 203 of the NAN device 111 according to this embodiment. This processing is executed when, for example, the NAN device 111 is supplied with power, and recognizes a nearby NAN device to perform communication in order to perform desired data communication in response to an instruction of a user or application. After the start of the processing, in step S301, the NAN device control unit 203 transmits, to the NAN function unit 202, an instruction to create a NAN cluster with the nearby NAN device. In this embodiment, as shown in FIG. 1, the NAN device 111 creates the NAN cluster 110 with the NAN device 112. After creation of the NAN cluster 110 is confirmed (YES in step S302), the process advances to step S303. In step S303, the NAN device control unit 203 transmits, to the NAN data link control unit 204, an instruction to establish a NAN data link for performing desired data communication with the NAN device 112. Subsequently, in step S304, the NAN device control unit 203 transmits, to the NAN merge control unit 205, an instruction to search for a new NAN cluster. This search for a new NAN cluster is performed to confirm whether a NAN cluster which can be merged exists around the NAN device 111.

After that, if the NAN device control unit 203 receives a NAN data link establishment completion notification from the NAN data link control unit 204 (YES in step S305), it performs management for maintaining the NAN data link by the NAN data link control unit 204. Note that instead of the processing in step S305, the NAN device control unit 203 may confirm with the NAN data link control unit 204 whether the NAN data link has been established. In addition, it is possible that only the NAN data link control unit 204 performs management for maintaining the established NAN data link.

Figure 4:
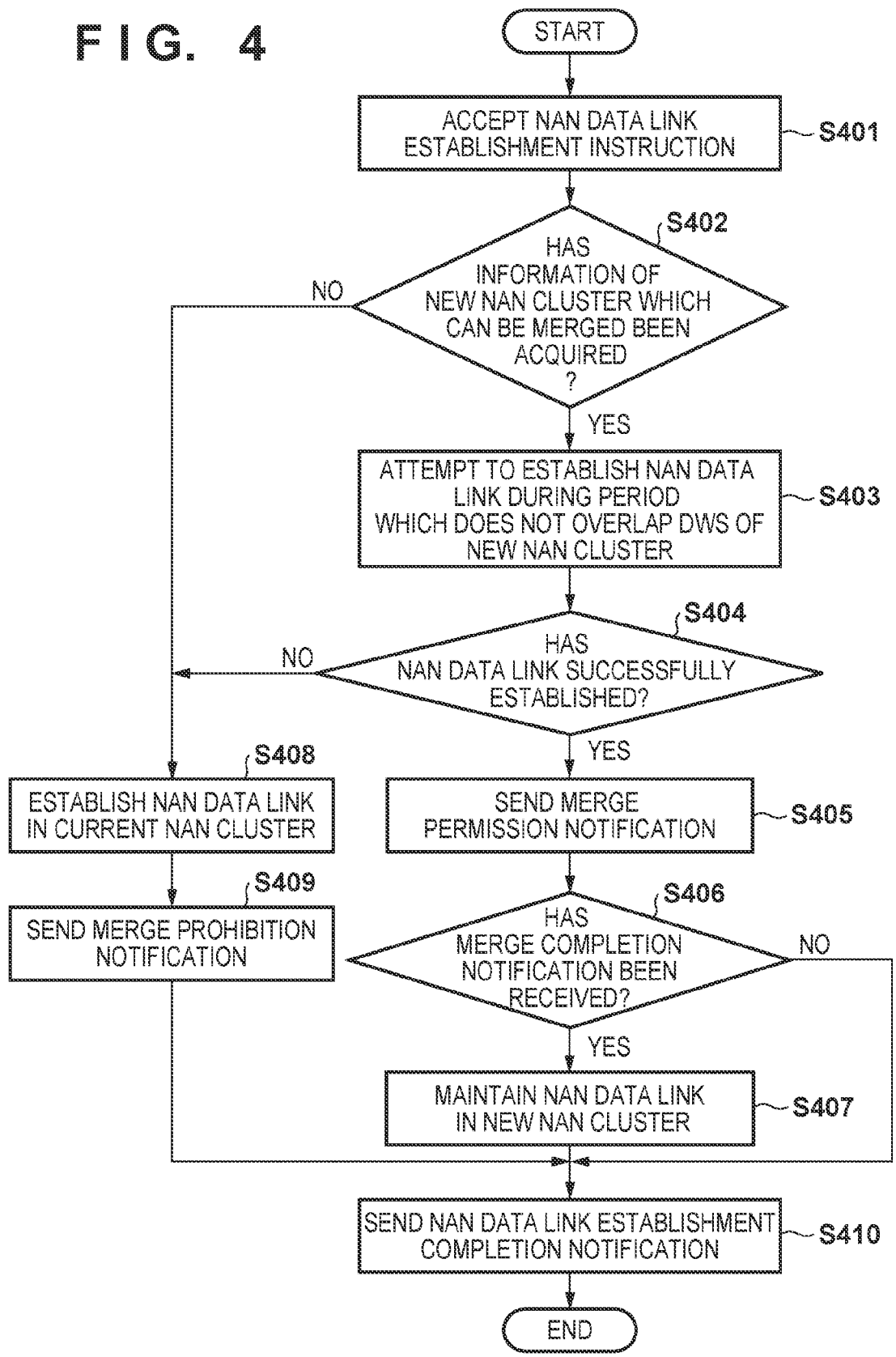
FIG. 4 is a flowchart illustrating the processing of a NAN data link control unit 204 according to the first embodiment.

FIG. 4 is a flowchart illustrating the processing of the NAN data link control unit 204 according to this embodiment. This processing is executed when, for example, the NAN device control unit 203 performs the control processing shown in FIG. 3. In step S401, the NAN data link control unit 204 accepts the NAN data link establishment instruction from the NAN device control unit 203. In step S402, the NAN data link control unit 204 stands by for acquisition, from the NAN merge control unit 205, of the information of a new NAN cluster which can be integrated (which can be merged).

If the NAN data link control unit 204 acquires the information of the new NAN cluster within a predetermined time (YES in step S402), the process advances to step S403. Note that in this embodiment, the NAN data link control unit 204 can acquire, as the information of the new NAN cluster, identification information for uniquely specifying the NAN cluster and synchronization time information (for example, information about a cyclic DW) of the NAN cluster. By exemplifying the wireless LAN system shown in FIG. 1, the NAN data link control unit 204 acquires the identification information of the NAN cluster 120 and the synchronization time information of the NAN cluster 120. Subsequently, in step S403, based on the information of the new NAN cluster and that of the current NAN cluster, the NAN data link control unit 204 sets a period of a NAN data link and attempts to establish the NAN data link so as to perform data communication in the current NAN cluster during a period which does not overlap the DWs of the new NAN cluster. By exemplifying the wireless LAN system shown in FIG. 1, the NAN data link control unit 204 sets a NAN data link during a period necessary for desired data communication by avoiding the DWs of the NAN cluster 120 and the DWs of the NAN cluster 110. The NAN data link control unit 204 negotiates with the NAN device 112 in terms of the setting.

As a result, if the NAN data link has been successfully established (YES in step S404), the NAN data link control unit 204 sends, in step S405, to the NAN merge control unit 205, a notification (merge permission notification) that the current NAN cluster may be merged into the new NAN cluster. The merge permission notification includes, for example, merging status information and information of another NAN device with which the NAN data link has been established. In step S406, the NAN data link control unit 204 stands by for reception of a merge completion notification from the NAN merge control unit 205. If the NAN data link control unit 204 receives no merge completion notification from the NAN merge control unit 205 within a predetermined time (NO in step S406), the process advances to step S410; otherwise (YES in step S406), the process advances to step S407. In step S407, the NAN data link control unit 204 maintains the NAN data link in the new NAN cluster by changing management information from the NAN cluster before merging to the new NAN cluster.

On the other hand, if the NAN data link control unit 204 acquires no information of the new NAN cluster within the predetermined time in step S402 (NO in step S402), the process advances to step S408. If the NAN data link control unit 204 fails to establish the NAN data link in step S404, the process advances to step S408. Note that instead of the processing in step S402, if the NAN data link control unit 204 receives, from the NAN merge control unit 205, a notification that there is no new NAN cluster which can be merged or if the NAN data link control unit 204 confirms with the NAN merge control unit 205 that there is no new NAN cluster which can be merged, the process may advance to step S408.

In step S408, the NAN data link control unit 204 sets a period of a data link so as to perform data communication in the current NAN cluster, and establishes the data link. At this time, the NAN data link control unit 204 sets the period of the data link independently of the DWs of the new NAN cluster. Subsequently, in step S409, the NAN data link control unit 204 sends, to the NAN merge control unit 205, a notification (merge prohibition notification) that the current NAN cluster is not merged into the new NAN cluster, and the process advances to step S410.

In step S410, the NAN data link control unit 204 notifies the NAN device control unit 203 of completion of establishment of the NAN data link.

Figure 5:
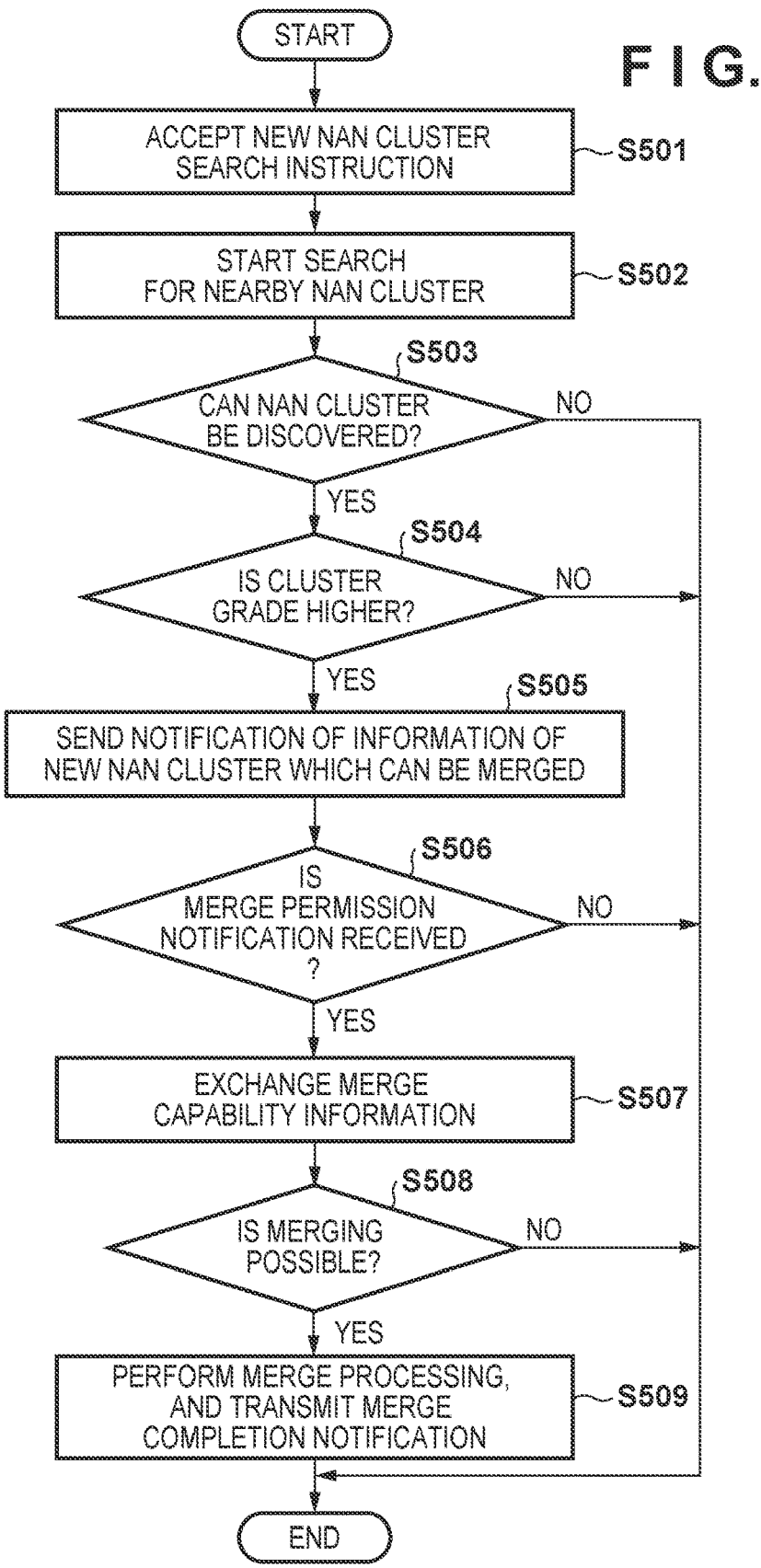
FIG. 5 is a flowchart illustrating the processing of a NAN merge control unit 205 according to the first embodiment.

FIG. 5 is a flowchart illustrating the processing of the NAN merge control unit 205 according to this embodiment. This processing is executed when, for example, the NAN device control unit 203 performs the control processing shown in FIG. 3. In step S501, the NAN merge control unit 205 accepts, from the NAN device control unit 203, a search for a new NAN cluster. In step S502, the NAN merge control unit 205 controls the NAN function unit 202 to perform the search by, for example, determining whether there is a NAN cluster nearby in addition to the current NAN cluster or standing by for reception of a synchronization beacon for a predetermined time. By exemplifying the wireless LAN system shown in FIG. 1, the NAN device 111 can receive a synchronization beacon transmitted in the NAN cluster 120.

In step S503, the NAN merge control unit 205 confirms whether a nearby NAN cluster can be discovered. If the NAN merge control unit 205 can discover the nearby NAN cluster (YES in step S503), the process advances to step S504. In step S504, based on the synchronization beacon of the discovered NAN cluster, the NAN merge control unit 205 performs comparison to determine which of the current NAN cluster and the discovered NAN cluster has a higher cluster grade (CG). That is, in step S504, the NAN merge control unit 205 determines whether there is a NAN cluster which can be integrated. Note that the cluster grade is based on the NAN standard, and indicates a criterion for selecting one NAN cluster when the NAN device discovers a plurality of NAN clusters. A cluster grade calculation method is based on the NAN standard and a description thereof will be omitted.

If it is determined that the cluster grade of the discovered NAN cluster is higher (YES in step S504), the process advances to step S505. In step S505, the NAN merge control unit 205 notifies the NAN data link control unit 204 of the information of the discovered NAN cluster as that of the new NAN cluster which can be merged. Subsequently, the NAN merge control unit 205 stands by for reception of one of the merge permission notification and the merge prohibition notification from the NAN data link control unit 204. If the merge permission notification is received (YES in step S506), the NAN data link is established during a period which does not overlap the DWs of the new NAN cluster. In step S507, the NAN merge control unit 205 exchanges merge capability information with another NAN device which joins the current NAN cluster and with which the NAN data link has been established. More specifically, the NAN devices transmit pieces of merge capability information each indicating that merging is possible or impossible, and receive them. Note that a merge capability information exchange method is based on the NAN standard and a description thereof will be omitted.

In step S508, the NAN merge control unit 205 confirms whether the current NAN cluster can be merged into the new NAN cluster. In this embodiment, if all of the pieces of merge capability information received from other NAN devices indicate that merging is possible, the NAN merge control unit 205 determines that merging is possible. If, however, any one of the pieces of merge capability information received from other NAN devices indicates that merging is impossible, the NAN merge control unit 205 determines that merging is impossible. If it is determined that merging is possible (YES in step S508), the process advances to step S509. In step S509, the NAN merge control unit 205 performs processing of merging the current NAN cluster into the new NAN cluster. A merge method is based on the NAN standard and a description thereof will be omitted. Upon completion of merging the current NAN cluster into the new NAN cluster, the NAN merge control unit 205 transmits a merge completion notification to the NAN data link control unit 204. If NO is determined in the processing in step S503, S504, S506, or S508, the process ends.

Figure 6:
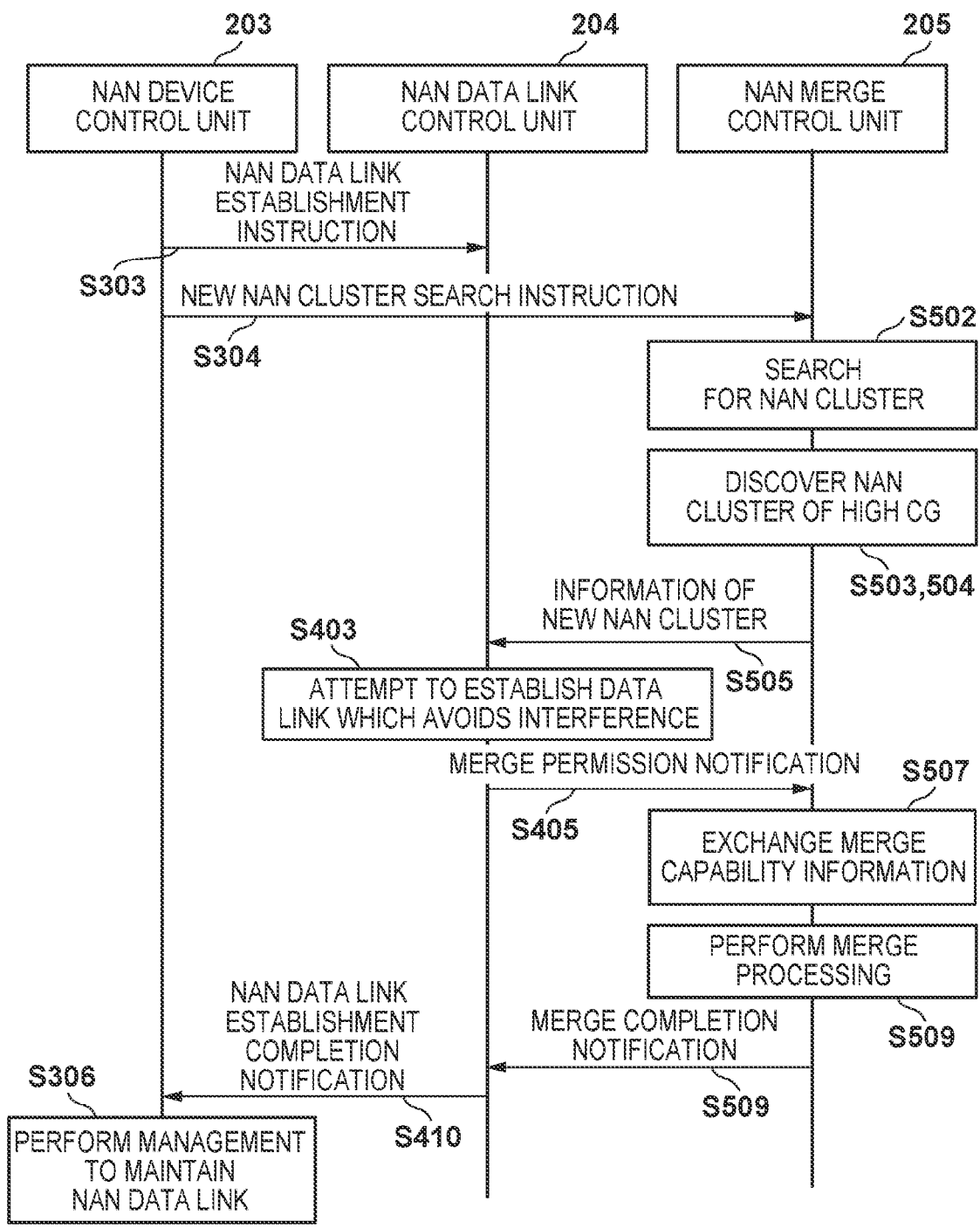
FIG. 6 is a sequence chart when establishing a data link which can avoid interference with a new NAN cluster.
Figure 7:
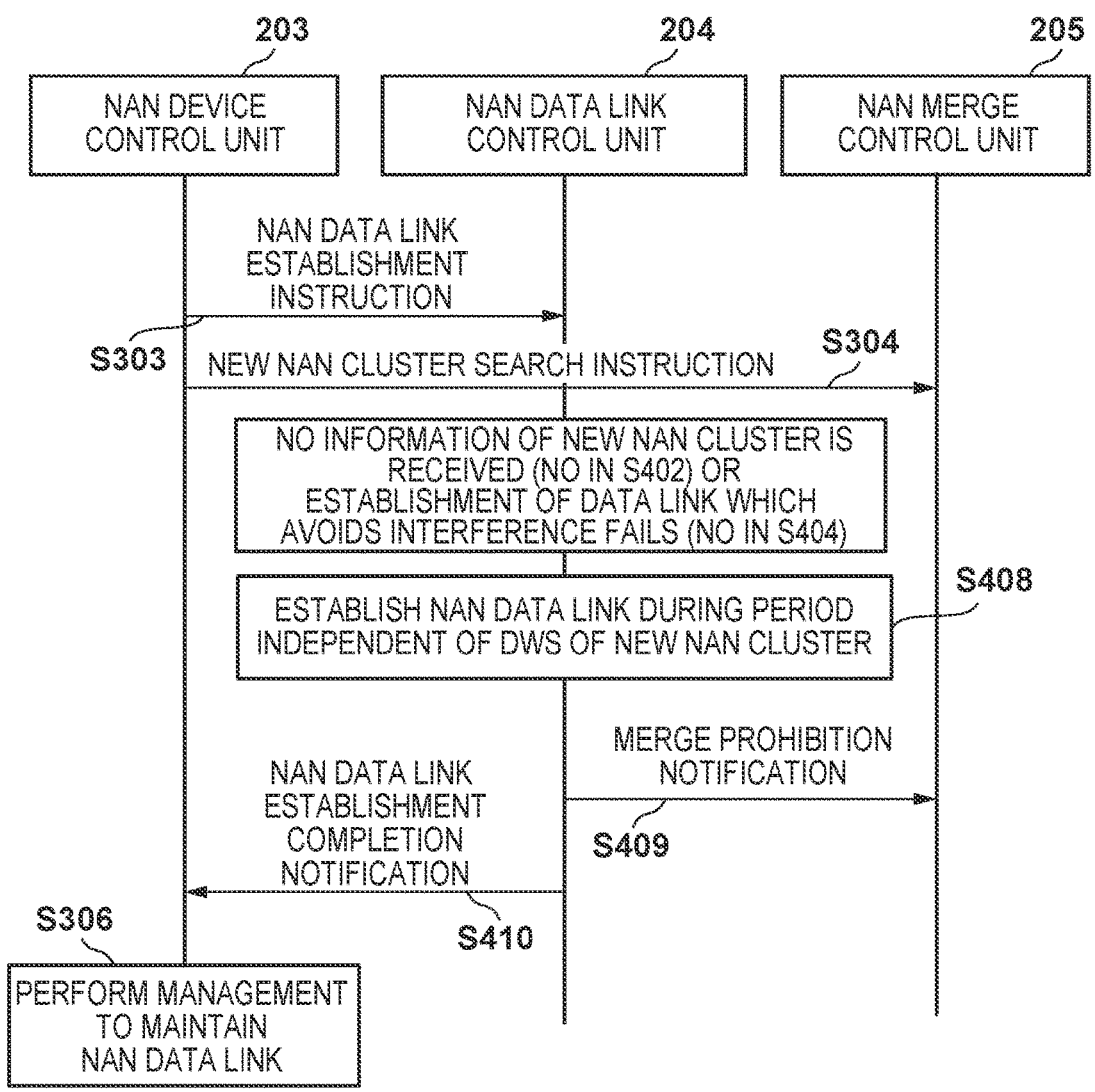
FIG. 7 is a sequence chart when establishing a NAN data link during a period independent of the DWs of the new NAN cluster.

FIG. 6 is a sequence chart when the NAN device 111 establishes a data link which can avoid interference with the new NAN cluster, and FIG. 7 is a sequence chart when the NAN device 111 establishes a NAN data link during a period independent of the DWs of the new NAN cluster. Reference symbols in FIGS. 6 and 7 correspond to those in FIGS. 3 and 5.

Figure 8:
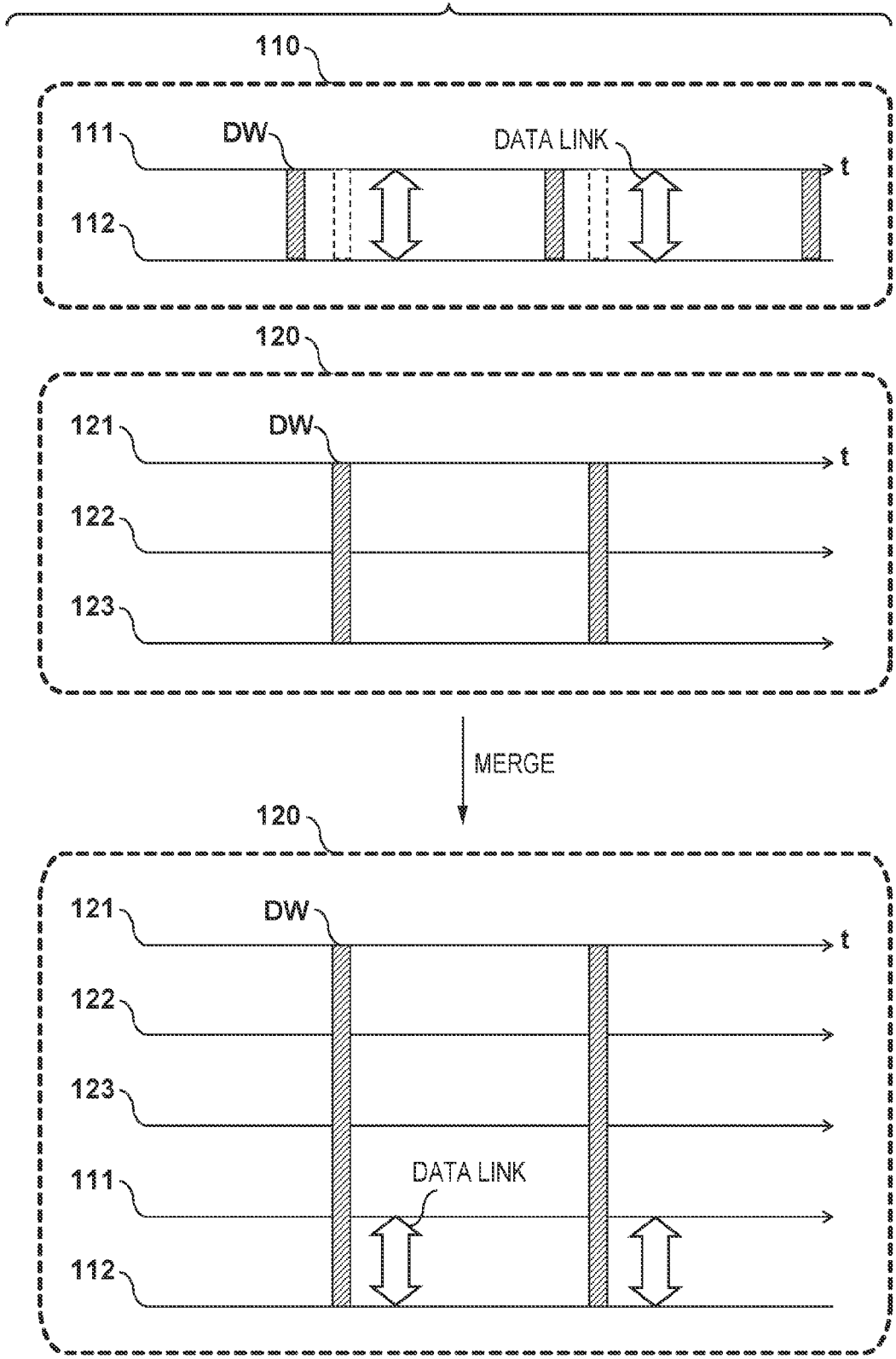
FIG. 8 is a view showing an operation example when a NAN cluster 110 is merged according to the first embodiment.

FIG. 8 shows an operation example when the NAN device 111 establishes NAN data links not to interfere with the new NAN cluster according to this embodiment. The abscissa is the time axis, each hatched portion indicates a period of a DW, and each arrow portion indicates a period of an established NAN data link. In the NAN cluster 110, the NAN device 111 establishes NAN data links with the NAN device 112 by avoiding the periods (dotted line portions) of the DWs of the NAN cluster 120 so as not to interfere with the periods. If merging is performed, the NAN data links with the NAN device 112 are maintained in the NAN cluster 120 as the new NAN cluster.

Figure 9:
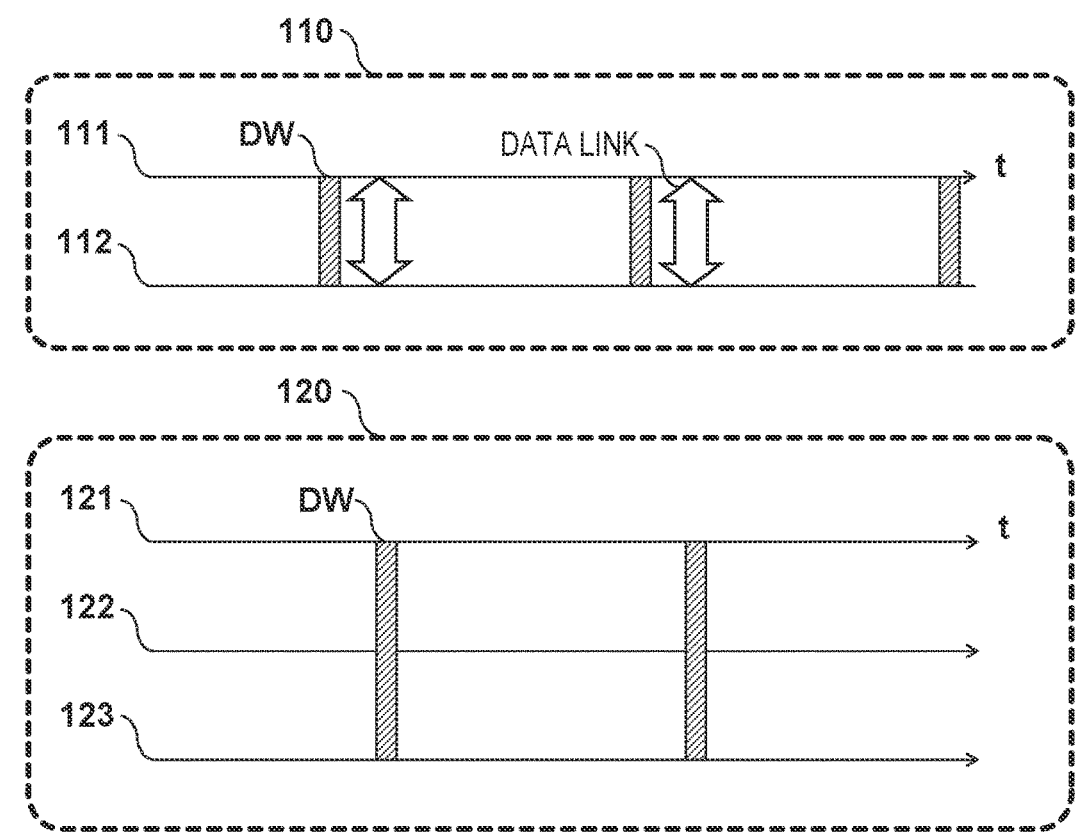
FIG. 9 is a view showing an operation example when the NAN cluster 110 is not merged according to the first embodiment.

FIG. 9 shows an operation example when the NAN device 111 establishes NAN data links independently of the DWs of the new NAN cluster according to this embodiment. The abscissa is the time axis, each hatched portion indicates a period of a DW, and each arrow portion indicates a period of an established NAN data link. FIG. 9 shows an operation example when the NAN device 111 attempts to establish NAN data links by avoiding the periods of the DWs of the NAN cluster 120 but fails, and thus establishes NAN data links during periods which overlap the DWs of the NAN cluster 120. In this case, the NAN cluster 110 is not merged into the NAN cluster 120.

Second Embodiment

The second embodiment will be described below with reference to FIGS. 10 and 11. Note that the difference from the first embodiment will be explained. The processing of a NAN device control unit 203 of a NAN device 111 according to this embodiment is the same as in the first embodiment, and is as described with reference to FIG. 3.

Figure 10:
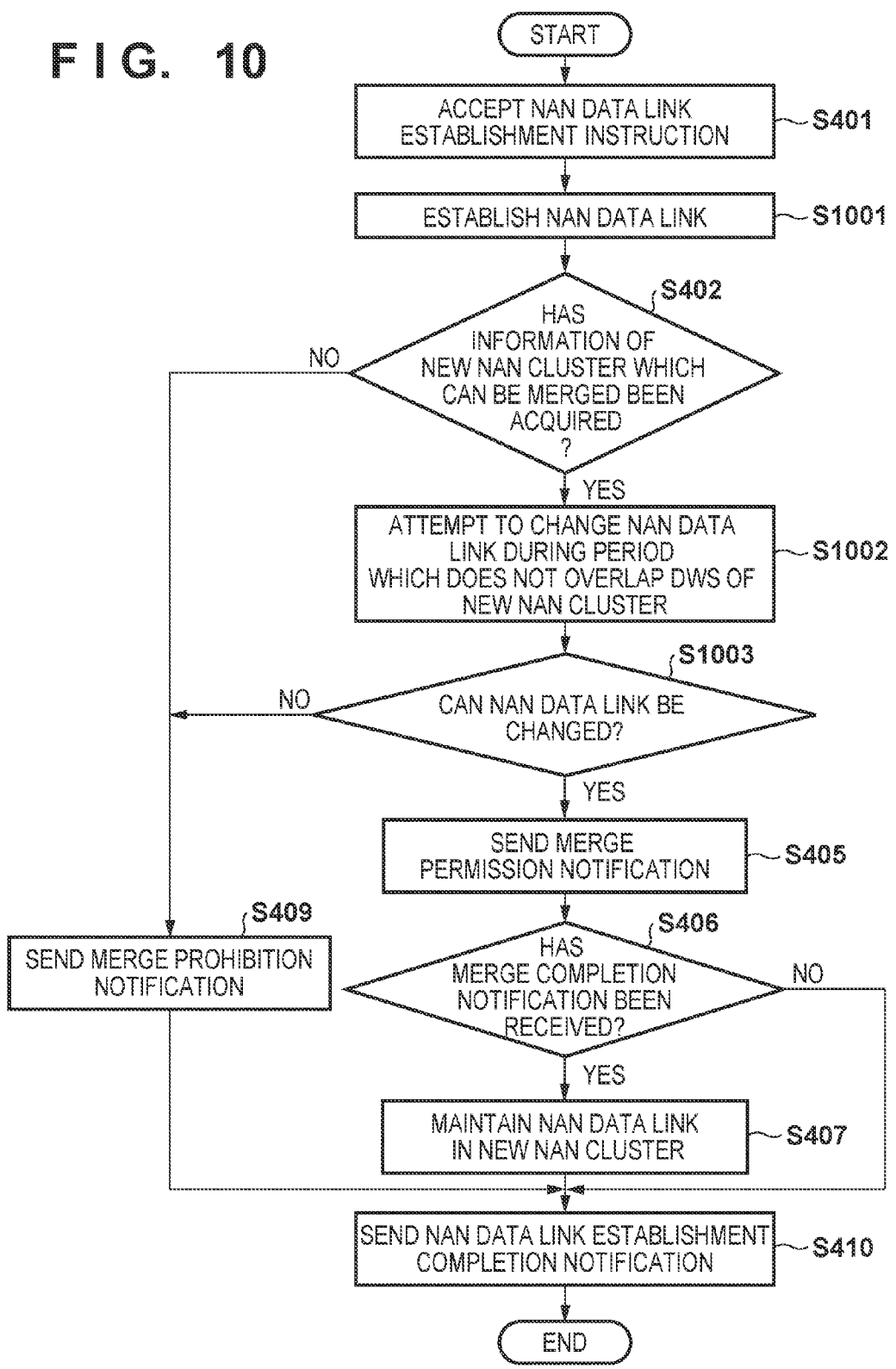
FIG. 10 is a flowchart illustrating the processing of a NAN data link control unit 204 according to the second embodiment.

FIG. 10 is a flowchart illustrating the processing of a NAN data link control unit 204 according to this embodiment. This processing is executed when, for example, the NAN device control unit 203 performs control. When the processing of the NAN data link control unit 204 according to this embodiment is compared with that shown in FIG. 4 described in the first embodiment, processes in steps S1001, S1002, and S1003 are different and the processing in step S408 is deleted.

After accepting a NAN data link establishment instruction from the NAN device control unit 203 in step S401 (YES in step S401), the NAN data link control unit 204 establishes a NAN data link in step S1001. In this case, the NAN data link control unit 204 sets a period of a NAN data link and establishes the NAN data link so as to perform data communication in the current NAN cluster. Subsequently, in step S402, the NAN data link control unit 204 stands by for acquisition, from a NAN merge control unit 205, of the information of a new NAN cluster which can be merged. The information of the new NAN cluster can include identification information for uniquely specifying the NAN cluster and the synchronization time information of the NAN cluster. By exemplifying a wireless LAN system shown in FIG. 1, the information of the new NAN cluster can include the identification information of a NAN cluster 120 and the synchronization time information of the NAN cluster 120.

If the NAN data link control unit 204 acquires, from the NAN merge control unit 205, the information of the new NAN cluster which can be merged (YES in step S402), the process advances to step S1002. In step S1002, based on the information of the new NAN cluster and that of the current NAN cluster, the NAN data link control unit 204 attempts to change the setting of the period of the NAN data link so as to perform data communication in the current NAN cluster during a period which does not overlap the DWs of the new NAN cluster. By exemplifying the wireless LAN system shown in FIG. 1, the NAN data link control unit 204 changes the setting of the NAN data link during a period necessary for desired data communication by avoiding the DWs of the NAN cluster 120 and the DWs of a NAN cluster 110. The NAN data link control unit 204 negotiates with a NAN device 112 in terms of the setting.

In step S1003, the NAN data link control unit 204 confirms whether the NAN data link can be changed in the current NAN cluster. If the NAN data link can be changed (YES in step S1003), the process advances to step S405. Processes in steps S405 to S407 and S409 are the same as those in FIG. 4 and a description thereof will be omitted.

If the NAN data link control unit 204 cannot acquire, from the NAN merge control unit 205, the information of the new NAN cluster which can be merged (NO in step S402), the process advances to step S409. If the NAN data link cannot be changed (NO in step S1003), the process advances to step S409. The processing in step S409 is the same as that in FIG. 4 and a description thereof will be omitted.

Figure 11:
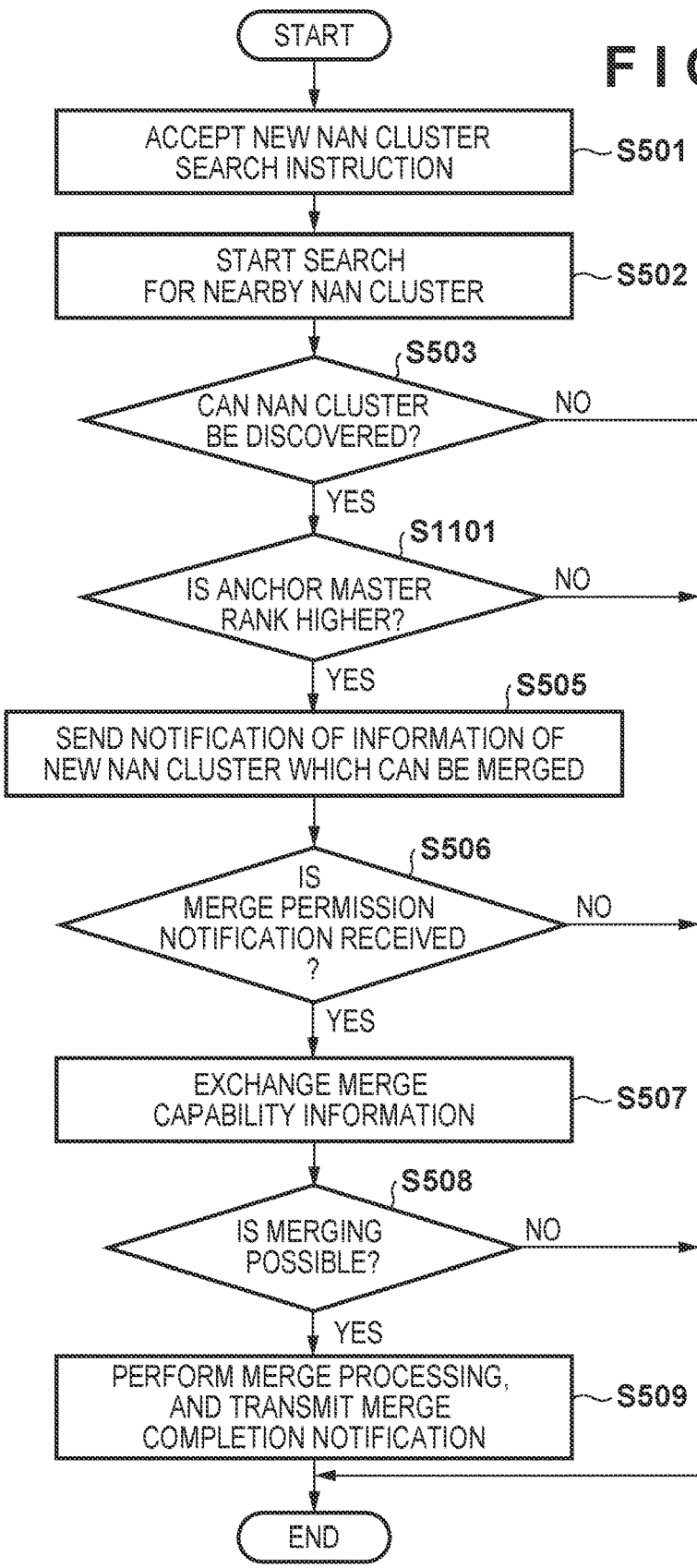
FIG. 11 is a flowchart illustrating the processing of a NAN merge control unit 205 according to the second embodiment.

FIG. 11 is a flowchart illustrating the processing of the NAN merge control unit 205 according to this embodiment. This processing is executed when, for example, the NAN device control unit 203 performs control. When the processing of the NAN merge control unit 205 according to this embodiment is compared with that shown in FIG. 5 described in the first embodiment, processing in step S1101 is different.

If the NAN merge control unit 205 discovers a NAN cluster in step S503 (YES in step S503), it performs, in step S1101, comparison based on the synchronization beacon of the discovered NAN cluster to determine which of the current NAN cluster and the discovered NAN cluster has a higher anchor master rank. The anchor master rank will now be described. In the NAN standard, a NAN device for determining a time reference in a NAN cluster is defined as a NAN device playing an anchor master role. In this example, a NAN device playing the anchor master role is decided based on master ranks as the values of respective NAN devices in a NAN cluster. More specifically, a NAN device having the highest master rank in the NAN cluster plays the anchor master role. The anchor master rank indicates the master rank of the NAN device playing the anchor master role. Note that a master rank deriving method is based on the NAN standard and a description thereof will be omitted.

If it is determined in step S1101 that the anchor master rank of the discovered NAN cluster is higher (YES in step S1101), the process advances to step S505; otherwise (NO in step S1101), the process ends. Processes in step S505 and subsequent steps are the same as those in FIG. 5 and a description thereof will be omitted.

Note that the processing of the NAN merge control unit 205 according to this embodiment is also applicable to the processing according to the first embodiment. In this case, the processing of the NAN data link control unit 204 is as shown in FIG. 4.

Third Embodiment

The third embodiment will be described below with reference to FIG. 12. Note that the difference from the first embodiment will be explained. The processing of a NAN device control unit 203 of a NAN device 111 according to this embodiment is the same as in the first embodiment, and is as described with reference to FIG. 3.

Figure 12:
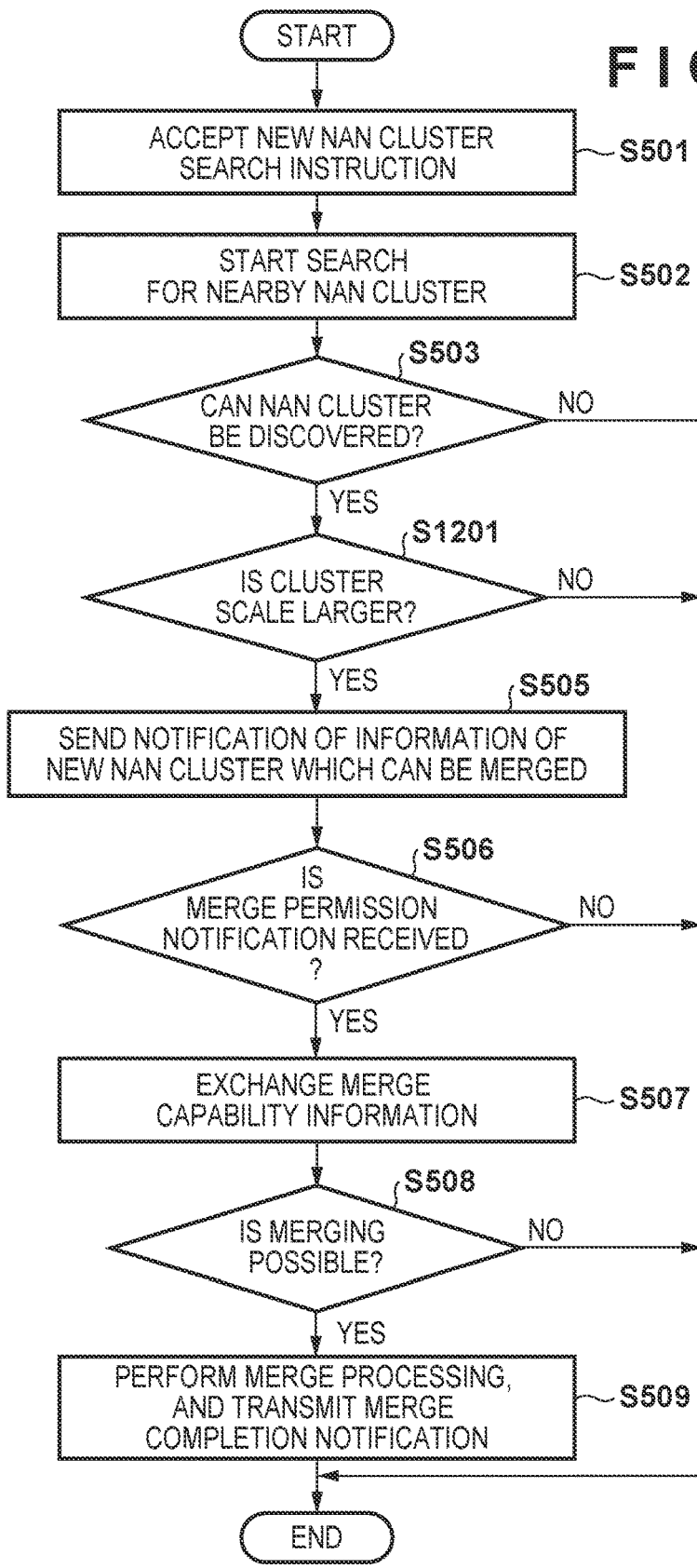
FIG. 12 is a flowchart illustrating the processing of a NAN merge control unit 205 according to the third embodiment.

FIG. 12 is a flowchart illustrating the processing of a NAN merge control unit 205 according to this embodiment. This processing is executed when, for example, the NAN device control unit 203 performs control. Note that the difference from the first embodiment will be described. When the processing of the NAN merge control unit 205 according to this embodiment is compared with that shown in FIG. 5 described in the first embodiment, processing in step S1201 is different.

If the NAN merge control unit 205 discovers a NAN cluster in step S503 (YES in step S503), it performs, in step S1201, comparison based on the synchronization beacon of the discovered NAN cluster to determine which of the current NAN cluster and the discovered NAN cluster has a larger cluster scale. In this embodiment, in a method of calculating the cluster scale of a NAN cluster, the number of NAN devices which transmit synchronization beacons in the NAN cluster is used. Assuming that all of the NAN device 111 and NAN devices 112, 121, 122, and 123 in a wireless LAN system shown in FIG. 1 transmit synchronization beacons, the cluster scales of NAN clusters 110 and 120 are 2 and 3, respectively.

If it is determined in step S1201 that the cluster scale of the discovered NAN cluster is larger (YES in step S1201), the process advances to step S505; otherwise (NO in step S1201), the process ends. Processes in step S505 and subsequent steps are the same as those in FIG. 5 and a description thereof will be omitted.

As described above, according to the aforementioned embodiments, when a cluster is merged, it is possible to suppress interference with another cluster, and continue and maintain an established data link. Note that in the above embodiments, the processing of a NAN device to be merged has been explained. However, the embodiments may be applied as the processing of a NAN device to merge. The above-described embodiments are merely examples to implement the present invention, and the present invention is not limited to them.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008292, filed Jan. 19, 2016, which is hereby incorporated by reference herein in its entirety.

What is claimed is:

1. A communication apparatus comprising:
   one or more processors; and
   one or more memories including instructions which, when executed by the one or more processors, cause the communication apparatus to:
   in a case where the communication apparatus is in a first cluster, detect a second cluster different from the first cluster, wherein the first cluster and the second cluster conform to a Neighbor Awareness Networking (NAN) standard;
   select a period which does not overlap any of a discovery window of the first cluster and a discovery window of the second cluster, as a communication period in which the communication apparatus communicates with another communication apparatus via a NAN Data Link in the first cluster;
   establish, with the another communication apparatus, the NAN Data Link in the first cluster that uses the selected communication period while the communication apparatus is in the first cluster; and
   merge the second cluster with the first cluster after successful establishment of the NAN Data Link with the another communication apparatus in the first cluster.

2. The communication apparatus according to claim 1, wherein the instructions, when executed by the one or more processors, further cause the communication apparatus to, in a case where the communication apparatus fails to establish, with the another communication apparatus, the NAN Data Link that is using the selected communication period, establish, with the another communication apparatus, an another NAN Data Link that is using another communication period which does not overlap the discovery window of the first cluster and which is different from the selected communication period.

3. The communication apparatus according to claim 1, wherein the instructions, when executed by the one or more processors, further cause the communication apparatus to, in a case where the communication apparatus merges the first cluster into the second cluster, establish, with the another communication apparatus, the NAN Data Link in the second cluster.

4. The communication apparatus according to claim 1, wherein the instructions, when executed by the one or more processors, further cause the communication apparatus to, in a case where the communication apparatus does not merge the first cluster into the second cluster, establish, with the another communication apparatus, the NAN Data Link in the first cluster.

5. The communication apparatus according to claim 1, wherein the second cluster has a higher cluster grade than a cluster grade of the first cluster.

6. A control method for a communication apparatus, the method comprising:
   in a case where the communication apparatus is in a first cluster, detecting a second cluster different from the first cluster, wherein the first cluster and the second cluster conform to a Neighbor Awareness Networking (NAN) standard;
   selecting a period which does not overlap any of a discovery window of the first cluster and a discovery window of the second cluster, as a communication period in which the communication apparatus communicates with another communication apparatus via a NAN Data Link in the first cluster;
   establishing, with the another communication apparatus, the NAN Data Link in the first cluster that uses the selected communication period while the communication apparatus is in the first cluster; and merging the second cluster with the first cluster after successful establishment of the NAN Data Link with the another communication apparatus in the first cluster.

7. A non-transitory computer readable medium storing a computer-executable program for causing a computer to perform a control method for a communication apparatus, the method comprising:

in a case where the communication apparatus is in a first cluster, detecting a second cluster different from the first cluster, wherein the first cluster and the second cluster conform to a Neighbor Awareness Networking (NAN) standard;

selecting a period which does not overlap any of a discovery window of the first cluster and a discovery window of the second cluster, as a communication period in which the communication apparatus communicates with another communication apparatus via a NAN Data Link in the first cluster;

establishing, with the another communication apparatus, the NAN Data Link in the first cluster that uses the selected communication period while the communication apparatus is in the first cluster; and merging the second cluster with the first cluster after successful establishment of the NAN Data Link with the another communication apparatus in the first cluster.

* * * * *